(12) United States Patent
Mathews et al.

(10) Patent No.: US 11,221,798 B2
(45) Date of Patent: *Jan. 11, 2022

(54) WRITE/READ TURN TECHNIQUES BASED ON LATENCY TOLERANCE

(71) Applicant: Apple Inc., Cupertino, CA (US)

(72) Inventors: Gregory S. Mathews, Saratoga, CA (US); Kai Lun Hsiung, Fremont, CA (US); Lakshmi Narasimha Murthy Nukala, Pleasanton, CA (US); Peter Fu, Saratoga, CA (US); Rakesh L. Notani, Santa Clara, CA (US); Sukalpa Biswas, Fremont, CA (US); Thejasvi Magudilu Vijayaraj, San Jose, CA (US); Yanzhe Liu, Sunnyvale, CA (US); Shane J. Keil, San Jose, CA (US)

(73) Assignee: Apple Inc., Cupertino, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 16/751,975

(22) Filed: Jan. 24, 2020

(65) Prior Publication Data

US 2020/0159463 A1  May 21, 2020

Related U.S. Application Data

(63) Continuation of application No. 16/104,307, filed on Aug. 17, 2018, now Pat. No. 10,545,701.

(51) Int. Cl.
  *G06F 3/06* (2006.01)
(52) U.S. Cl.
  CPC .......... *G06F 3/0659* (2013.01); *G06F 3/0611* (2013.01); *G06F 3/0673* (2013.01)

(58) Field of Classification Search
  CPC ...... G06F 3/0659; G06F 3/0611; G06F 3/061; G06F 3/0673; G06F 13/1605; G06F 13/161; G06F 13/1626; G06F 13/1642
  See application file for complete search history.

(56) References Cited

U.S. PATENT DOCUMENTS

| | | |
|---|---|---|
| 6,704,821 B2 | 3/2004 | Scandurra et al. |
| 8,314,807 B2 | 11/2012 | Biswas et al. |
| 8,321,627 B1 | 11/2012 | Norrie et al. |

(Continued)

OTHER PUBLICATIONS

P. Zhou, Y. Du, Y. Zhang and J. Yang, "Fine-grained QoS scheduling for PCM-based main memory systems," 2010 IEEE International Symposium on Parallel & Distributed Processing (IPDPS), 2010. (Year: 2010).*

*Primary Examiner* — Khoa D Doan
(74) *Attorney, Agent, or Firm* — Kowert, Hood, Munyon, Rankin & Goetzel, P.C.; Michael B. Davis

(57) ABSTRACT

Techniques relating to arbitration in a memory controller are disclosed. In some embodiments, the memory controller is configured to transition between read turns and writes turn according to a turn schedule. In some embodiments, the memory controller also receives reports from circuitry requesting memory transactions and determines a current latency tolerance value based on the reports. In some embodiments, the memory controller is configured to switch from a write turn to a read turn prior to a scheduled switch based on the current latency tolerance meeting a threshold value.

17 Claims, 13 Drawing Sheets

(56) References Cited

U.S. PATENT DOCUMENTS

| | | | |
|---|---|---|---|
| 8,510,521 B2* | 8/2013 | Biswas | G06F 13/1626 |
| | | | 711/154 |
| 8,812,797 B2 | 8/2014 | Henriksson et al. | |
| 10,157,023 B2* | 12/2018 | Moon | G06F 3/061 |
| 2001/0010066 A1* | 7/2001 | Chin | G06F 13/1605 |
| | | | 711/108 |
| 2003/0061459 A1* | 3/2003 | Aboulenein | G06F 12/0215 |
| | | | 711/167 |
| 2003/0093630 A1* | 5/2003 | Richard | G06F 13/1626 |
| | | | 711/154 |
| 2006/0107001 A1* | 5/2006 | Barnum | G06F 13/1626 |
| | | | 711/154 |
| 2009/0049256 A1 | 2/2009 | Hughes et al. | |
| 2014/0101340 A1* | 4/2014 | Jandhyam | G06F 3/0659 |
| | | | 710/6 |

\* cited by examiner

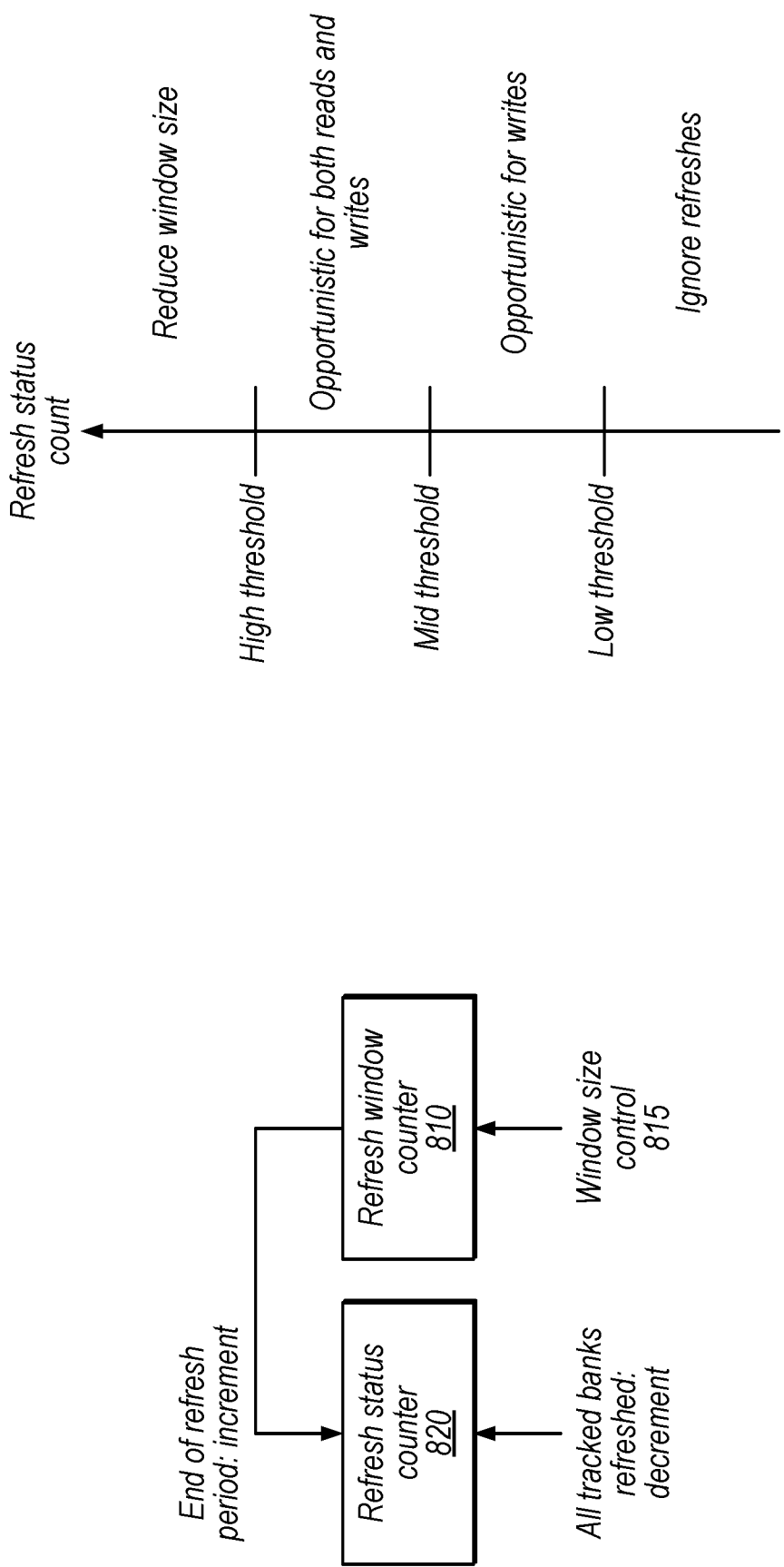

WRITE/READ TURN TECHNIQUES BASED ON LATENCY TOLERANCE

This application is a continuation of U.S. patent application Ser. No. 16/104,307, filed Aug. 17, 2018 (now U.S. Pat. No. 10,545,701), the disclosure of which is fully incorporated herein by reference for all purposes and to the extent not inconsistent with this application.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

BACKGROUND

Technical Field

Techniques are disclosed relating to memory controllers, and more particularly to arbitration based on latency tolerance.

Description of the Relevant Art

Computing systems typically include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from one or more devices included in, or coupled to, the computing system. Such data may also be stored, and later retrieved from a memory.

In some implementations, memory traffic is grouped into different types, which are provided different quality of service parameters. Providing service that meets these parameters while accessing memory efficiently may improve performance and reduce power consumption. Examples of accessing memory efficiently include decisions for when to switch between read and write turns and how to order accesses to different memory banks, for example.

BRIEF DESCRIPTION OF THE DRAWINGS

FIGS. 8A-8B are diagrams illustrating exemplary refresh circuitry configured to opportunistically perform refreshes based on refresh status, according to some embodiments.

Figure 1:
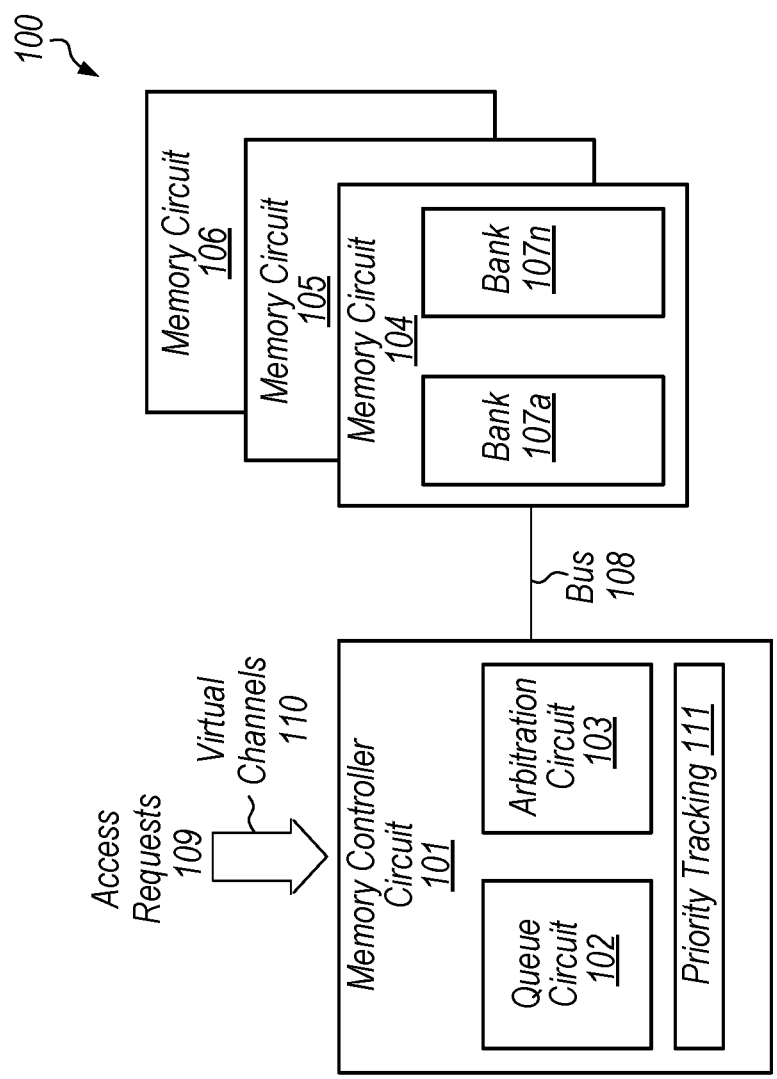
FIG. 1 is a generalized block diagram illustrating an exemplary memory system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory controller configured to arbitrate among requests to access a memory" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

During operation of a computing system, memory circuits may store a variety of data relating to operands, instructions, graphics or other visual data, and the like. Different agents may request memory operations from a memory controller, such as a central processing unit, a graphic processing unit, a display unit, I/O units, etc. Access requests may be categorized and/or aggregated. Certain quality of service characteristics may be provided to different types of memory traffic (which may be grouped into "virtual channels").

Figure 2:
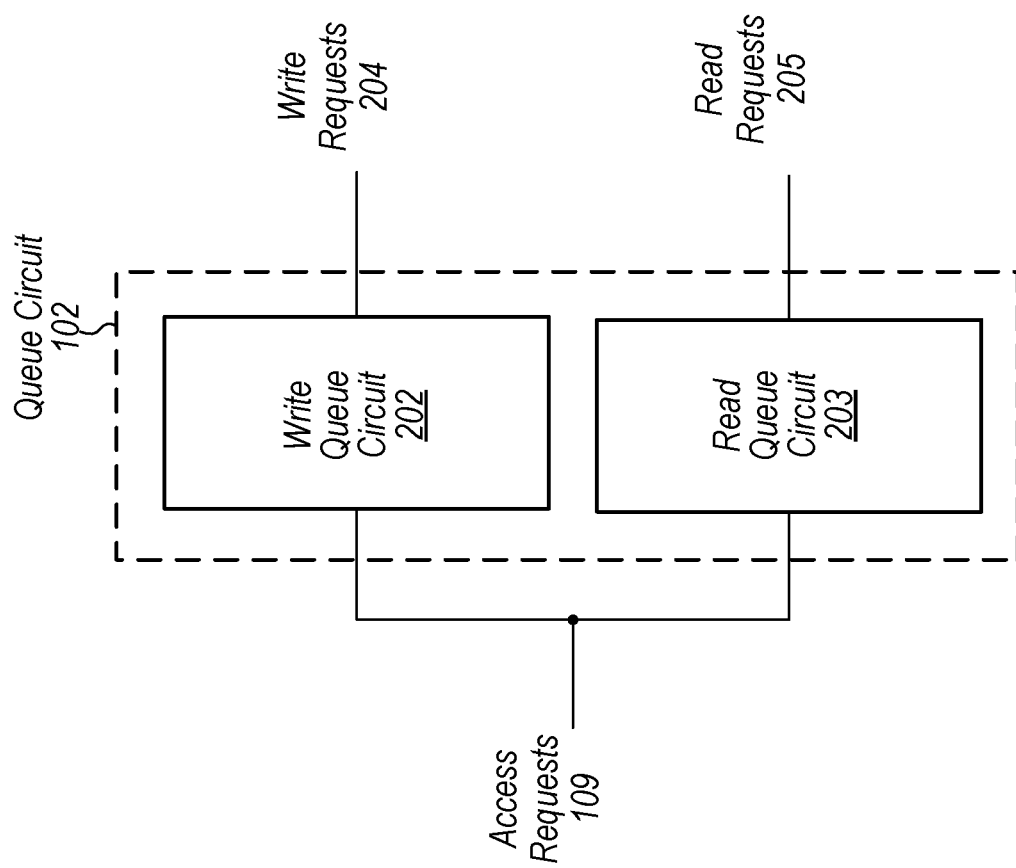
FIG. 2 is a block diagram depicting an exemplary memory controller circuit, according to some embodiments.
Figure 3:
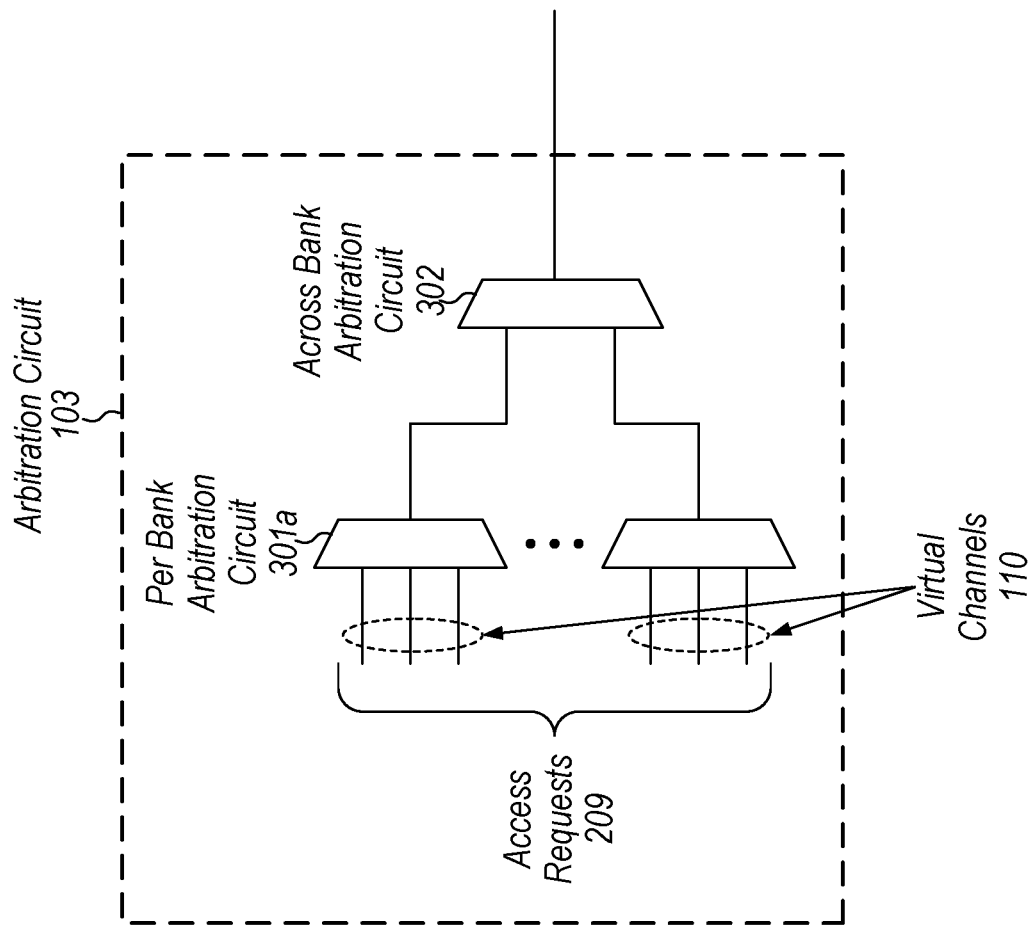
FIG. 3 is a block diagram illustrating exemplary arbitration circuitry for multiple different types of traffic and multiple banks, according to some embodiments.

This disclosure initially describes, with reference to FIGS. 1-3, an overview of a memory system. In disclosed embodiments, the memory controller uses an arbitration scheme (e.g., a category-based arbitration scheme discussed in further detail below) to select from requests from different virtual channels to different memory banks.

In some embodiments, described below with reference to FIGS. 4-5B, certain types of traffic are provided with overrides to the arbitration scheme based on their latency tolerance. These override techniques may advantageously mitigate consequences of agents requesting too little bandwidth for real-time tasks, for example, while providing other low latency tasks with low latency tolerance, in various embodiments.

In some embodiments, described below with reference to FIG. 6, the memory controller is configured to force an early turn (e.g., from a write turn to a read turn) under certain circumstances. In some embodiments, described below with reference to FIGS. 7A-7B, a transfer function is used to assign bandwidth based on latency tolerance. In some embodiments, described below with reference to FIGS. 8A-9, the memory controller is configured to opportunistically perform refreshes during read and/or write turns, using different modes in different circumstances.

In various embodiments, the disclosed techniques may improve memory performance (e.g., bandwidth, latency, etc.), reduce power consumption, and/or satisfy quality of service guarantees. Note that various techniques discussed herein (e.g., category arbitration, overrides, forced turns, bandwidth transfer functions, refresh, etc.) may be performed independently or in combination. To the extent that these techniques are discussed in combination to facilitate explanation, this is not intended to foreclose other combinations or independent use.

Overview of Memory System

FIG. 1 is a block diagram illustrating an exemplary memory system, according to some embodiments. In the illustrated embodiment, system 100 includes memory controller circuit 101 and a plurality of memory circuits 104-106 (note that any of various numbers of memory circuits may be implemented in other embodiments, and memory circuits may include various different numbers of banks per circuit). In the illustrated embodiment, memory controller circuit 101 is configured to communicate with memory circuits 104 via bus 108.

Memory control circuit 101, in the illustrated embodiment, receives access requests 109 via multiple virtual channels 110. In some embodiments, the virtual channels carry different types of requests and have different quality of service requirements. Requests from certain agents may be sent via a particular virtual channel, or an agent may be configured to send requests via multiple different virtual channels. In some embodiments, discussed in further detail below, the virtual channels include a real-time channel, a low-latency channel, and a bulk (or best-effort) channel.

Memory controller circuit 101, in the illustrated embodiment, includes a queue circuit 102, an arbitration circuit 103 and a priority tracking structure 111. Queue circuit 102, in some embodiments, is configured to queue received requests. Arbitration circuit 103, in some embodiments, is configured to select which requests are allowed to access certain memory banks 107. In some embodiments, arbitration circuit 103 is configured to use information in priority tracking structure 111 to determine which requests to grant. Non-limiting examples of information maintained in priority tracking structure 111 are discussed below with reference to FIG. 4.

Memory circuits 104-106, in the illustrated embodiment, each include a plurality of banks 107a-n. Memory circuits 104-106 may be implemented using any of various appropriate memory technologies. Memory circuits 104-106 may need to be refreshed periodically, e.g., if implemented as dynamic random access memory (DRAM). Further, it may be efficient to spread out access requests to different banks, e.g., because there may be a delay between consecutive accesses to different pages of the same bank. Therefore, speaking generally, arbitration circuit 103 attempts to grant access to one of a set of banks that has not been accessed within a threshold time interval.

FIG. 2 is a diagram illustrating an exemplary queue circuit 102 in greater detail, according to some embodiments. In the illustrated embodiment, queue circuit 102 receives access requests 109 and stores requests in either a write queue circuit 202 or a read queue circuit 203. Write request 204 and read requests 205 are then available to arbitration circuit 103, in some embodiments. In some embodiments, queue circuit 102 is configured to provide status information (not explicitly shown) indicating the number of valid entries in one or both of write queue 202 and read queue 203. In some embodiments, various control information may specify attributes of requests stored in queues 202 and/or 203. In some embodiments, multiple read queues and/or multiple write queues may be implemented, e.g., for different types of traffic.

FIG. 3 is a diagram illustrating an exemplary arbitration circuit 103 in greater detail, according to some embodiments. In the illustrated embodiment, a per-bank arbitration circuit 301 is configured to arbitrate among access requests from different virtual channels 110 for a given bank. In the illustrated embodiment, the winning virtual channel for each bank is provided to an across-bank arbitration circuit 302, which may be configured to select which bank is accessed in a given cycle.

In some embodiments, arbitration circuit 103 is configured to implement a category-based arbitration scheme. In some embodiments, each virtual channel is assigned a category value (e.g., C0 through C3, in some embodiments, although any of various numbers of categories may be implemented in other embodiments). Arbitration circuit 103 may assign each virtual channel a category for each bank. In some embodiments, each virtual channel begins at C3 for each bank and arbitration circuit 103 is configured to prioritize C3 channels over other channels. A least-recently-used (LRU) scheme may be used to pick from among virtual channels with the same category for a bank. In some embodiments, certain low-priority virtual channels are always provided a certain low category such as C1 or C0.

When a virtual channel wins arbitration and is granted an access to a particular bank, in some embodiments the memory controller 101 decrements its category for that bank (e.g., from C3 to C2 or from C2 to C1). In some embodiments, when a virtual channel has been reduced below a certain level for each bank for which it has requests (e.g., to C2 or below), the memory controller 101 is configured to increment all the categories for that virtual channel by one level (e.g., from C2 to C3). Note that when discussing "each" memory bank of a set of multiple memory banks herein, the disclosed techniques may be applied to the set of memory banks, but not necessarily all memory banks in the device or system. For example, other memory banks in the same device may be controlled by other memory controllers or devices.

In some embodiments, memory controller 101 also implements a credit system to allow a certain number of requests per virtual channel for a given read or write turn, e.g., based on requested or allocated bandwidth for the different virtual channels. This credit system may affect which virtual channels are actually sending requests to arbitration circuit 103 during a given turn.

In various embodiments, the category-based arbitration scheme may provide fair access to a given bank from among multiple virtual channels, while rotating among banks to avoid delays relating to accessing the same bank in quick succession.

Exemplary Types of Traffic

In some embodiments, memory requests are grouped and memory controller 101 provides different quality of service (QoS) to different types of requests. In some embodiments, different groups have one or more different QoS parameters (e.g., bandwidth, latency, etc.). These groups may be referred to herein as virtual channels. In some embodiments, these virtual channels include real-time (RT), low-latency (LLT), and bulk (best-effort). Speaking generally, RT traffic wants guaranteed bandwidth and a guaranteed worst-case latency, while LLT traffic wants minimized latency and may not need significant bandwidth. For example, RT agents may include media streaming agents, graphics processors, etc. In some embodiments, LLT traffic is highest priority when RT traffic is achieving its requested bandwidth, but RT is otherwise higher priority than LLT. A central processing unit is one example of an agent that may send LLT traffic. Note that a given requesting agent may send requests via multiple virtual channels, in some embodiments. In some embodiments, bulk traffic is lowest priority, among the three example types. Note that these types of traffic are discussed herein for purposes of illustration but are not intended to limit the scope of the present disclosure. In other embodiments, additional types of traffic may be implemented and different agents may be classified as having different types of traffic.

Exemplary Override Techniques

In some embodiments, arbitration circuit 103 is configured to provide per-bank overrides of a default arbitration scheme based on latency tolerance conditions.

Figure 4:
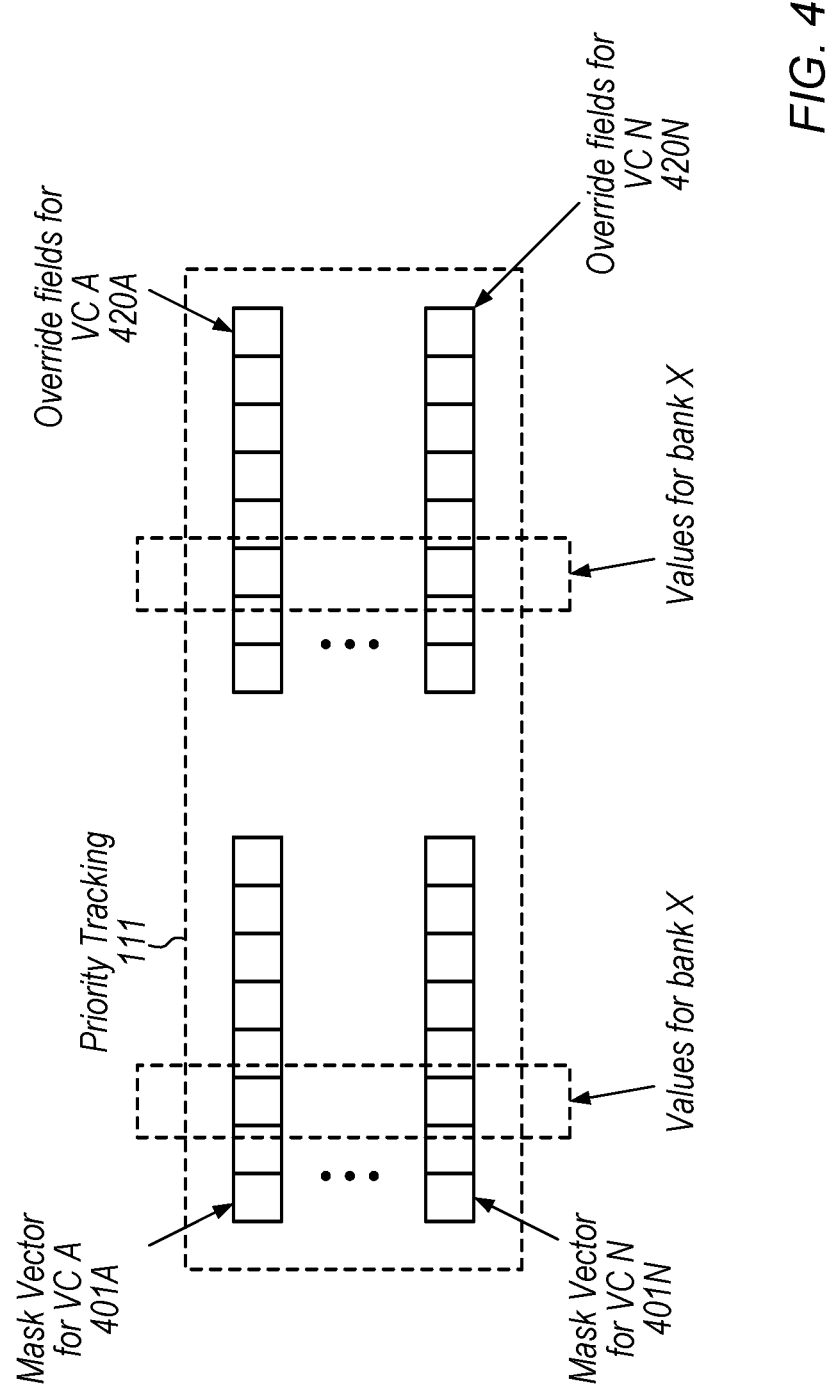
FIG. 4 is a block diagram illustrating exemplary fields for per-bank priority and override tracking, according to some embodiments.

FIG. 4 is a diagram illustrating exemplary priority tracking circuitry with override fields, according to some embodiments. In the illustrated embodiment, priority tracking circuitry 111 maintains a mask vector 401 and a set of override fields 420 for each virtual channel A-N. In some embodiments, the number of entries in the mask vectors and override field arrays corresponds to the number of memory banks handled. Said another way, each virtual channel may have a mask vector entry and override field for each bank. For an exemplary embodiment with four priority levels, each mask vector entry may be implemented using two bits and each override field may be implemented using a single bit.

Mask vectors 401, in some embodiments, are configured to store the current category for a particular virtual channel for a particular bank. As discussed above, the memory controller 101 may adjust these values based on granted requests and/or based on the status of the overall mask vector for a given virtual channel. In some embodiments, lower-priority virtual channels such as bulk may not have a mask vector or override fields, e.g., they may have a fixed category and may not be able to receive overrides.

In some embodiments, the override fields 420 may allow arbitration circuit 103 to override the category-based arbitration scheme (or any other arbitration scheme that includes per-bank analysis) under certain conditions. In some embodiments, arbitration circuit 103 is configured to prioritize requests for which an override field is set. For example, arbitration circuit 103 may select one (or more) requests from a virtual channel with an override first for a bank, regardless of the priority of other virtual channels. Said another way, having an override may be equivalent to having both a highest priority level and least recently granted status. Arbitration circuit 103 may clear the corresponding override field after granting one or more requests in response to the override field. Note that, if a virtual channel already has a highest priority level and least recently granted status, an override may allow arbitration circuit 103 to select requests from that virtual channel multiple times consecutively for the corresponding bank.

In some embodiments, requests granted based on overrides consume slots for a virtual channel (e.g., where slots are allocated to a virtual channel during a given read or write term using a credit system), but do not cause updates to the priority (e.g., the category level) for the granted virtual channel.

Figure 5B:
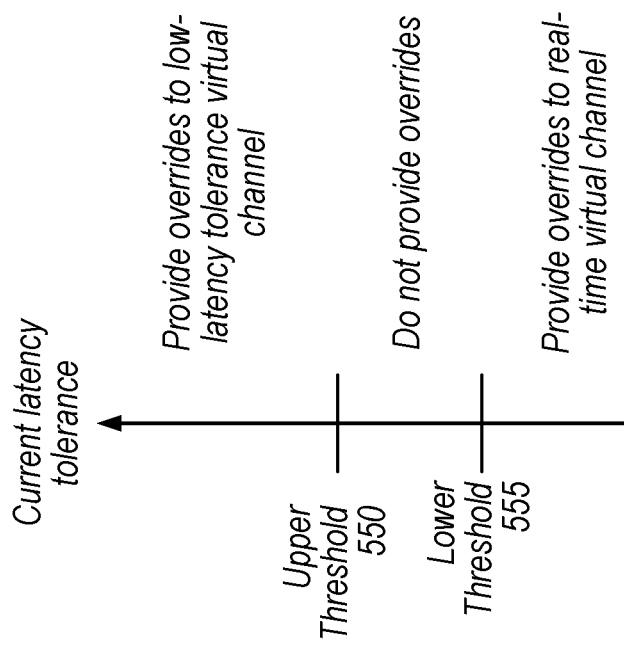
FIGS. 5A-5B are diagrams illustrating exemplary override circuitry that uses current latency tolerance as an input, according to some embodiments.
Figure 5A:
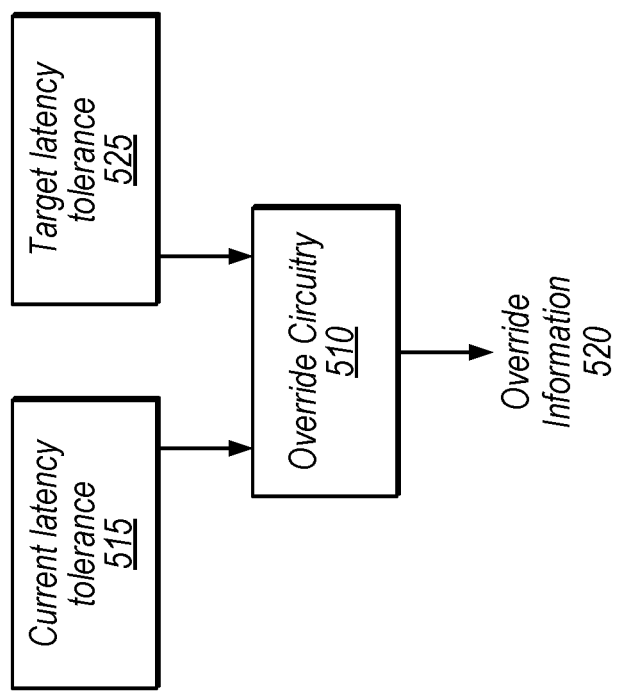

FIG. 5A is a diagram illustrating exemplary override circuitry configured to grant overrides in certain situations, according to some embodiments. FIG. 5B is a diagram illustrating exemplary thresholds for determining when to grant overrides.

In some embodiments, arbitration circuit 103 includes override circuitry 510 and is configured to maintain a current latency tolerance value 515 and a target latency tolerance value 525, as shown in FIG. 5A. In some embodiments, the current latency tolerance value 515 is for RT traffic. Override circuitry 510, in the illustrated embodiment, is configured to generate override information 520 based on the current and target latency tolerance levels.

The current latency tolerance 515 (which may be abbreviated as CLTR) may be based on reports from one or more circuits who send requests. In some embodiments, only RT requesters send current latency tolerance reports. These agents may determine and report their buffer status (e.g., time to overflow/underflow), which may indicate whether or not they requested enough bandwidth and/or whether their requested bandwidth is being satisfied. In other embodiments, current latency tolerance may be aggregated or separately maintained for multiple different virtual channels. In the illustrated embodiment, a single current latency tolerance value 515 is maintained (which may be determined based on reports from multiple agents), but this information may be determined, maintained, and used on a per-agent basis in other embodiments. In some embodiments, separate current latency tolerance values may be maintained for reads and writes.

Speaking generally, a higher current latency tolerance (e.g., near the target latency tolerance) may indicate that RT traffic is receiving the bandwidth it needs while a low current latency tolerance may indicate that RT traffic is at risk (e.g., of buffer overflow/underflow).

The target latency tolerance 525 may be determined by the system 100, for example, and may be based, without limitation, upon parameters such as the size of various buffers, the current operating mode, and threshold buffer space required to allow for planned and unplanned system events such as resource unavailability events. For example, in the case where a planned memory unavailability event is forthcoming, the target latency tolerance may be increased (and a delay until the current latency target reaches the target latency target may be enforced) before the unavailability event is allowed to be executed. In other embodiments, target latency tolerance 525 may be static.

FIG. 5B shows an example upper threshold 550 and lower threshold 555 for current latency tolerance values. In the illustrated embodiment, override circuitry 510 is configured to provide overrides to RT traffic (e.g., for each bank or to a subset of banks) when the current latency tolerance is below lower threshold 555. This may allow RT agents to catch back up and receive their desired bandwidth. In the illustrated embodiment, override circuitry 510 is configured not to provide overrides when the current latency tolerance 515 is between lower threshold 555 and upper threshold 550. In the illustrated embodiment, override circuitry 510 is configured to provide overrides to LLT traffic when the current latency tolerance is above upper threshold 550. This may allow LLT traffic to have reduced latency when RT agents are receiving enough bandwidth.

In other embodiments, varying numbers of thresholds may be used and overrides may be provided to other types of traffic. In some embodiments, override circuitry 510 is configured to provide additional overrides if the current latency tolerance stays above upper threshold 550 or below lower threshold 555. For example, override circuitry 510 may periodically provide overrides to corresponding traffic. As another example, override circuitry 510 may provide additional overrides in response to all the provided overrides being used (e.g., all cleared entries in a set of override fields 420 for the relevant channel) and the current latency tolerance continuing to meet the relevant threshold.

In some embodiments, overrides are subject to additional conditions. For example, overrides may be restricted to situations where there are at least a threshold number of slots remaining in a corresponding read or write turn and a threshold number of slots remaining for the particular virtual channel receiving the override. As used herein, a "slot" refers to a time interval in which the memory is to be accessed, and slots may be assigned to in different numbers to different virtual channels within a given read or write turn. For example, a slot may correspond to the amount of time needed for a column address strobe (CAS) used to read or write 64 bytes of data. The number of slots per turn for each virtual channel may be determined based on various criteria (e.g., as discussed in further detail below with reference to FIGS. 7A-7B) while the actual requests serviced in different slots may be determined by arbitration circuit 103. Said another way, receiving N RT slots for a write turn may guarantee N RT memory accesses during the turn (absent and early end to the turn), but does not indicate when in the turn the accesses will occur (rather, arbitration circuit 103 may determine which requests to grant in each slot).

Exemplary Forced Turn Techniques

In some embodiments, memory controller circuit 101 is configured to switch between read and write turns. In some embodiments, write transactions are posted such that they do not need to be performed when received but may be delayed until they can be performed at a more convenient or efficient time. In these embodiments, writes may not be problematic from a latency standpoint, but may still be important from a bandwidth perspective and latency may remain important for reads.

Memory controller circuit 101 may be configured to determine, for a set of N transactions, how many of the transactions should be allocated to writes in a write turn and reads in a read turn, e.g., based on current queue levels, historical traffic, etc. This turn allocation may be efficient from an overall read latency standpoint, but does not focus on latency for specific read transactions. This may be acceptable for RT traffic but undesirable for LLT traffic. Therefore, in some embodiments, memory controller circuit 101 is configured to force a turn from a write turn to a read turn in certain situations, before completing the planned write turn.

Figure 6:
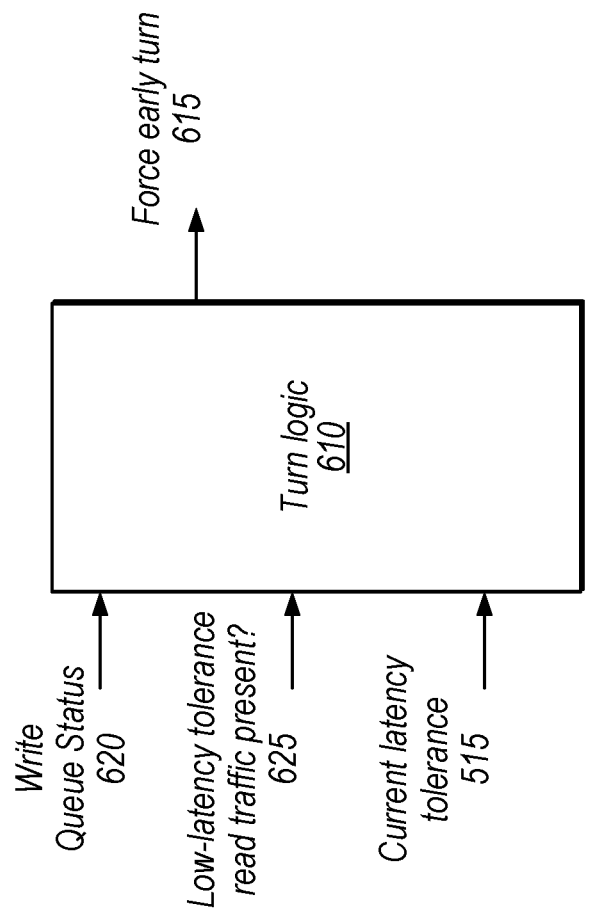
FIG. 6 is a block diagram illustrating exemplary logic configured to force an early turn (e.g., from writes to reads), according to some embodiments.

FIG. 6 is a block diagram illustrating exemplary turn logic 610 configured to initiate a forced turn, according to some embodiments. In the illustrated embodiment, turn logic 610 receives write queue status information 620, an indication of whether LLT read transactions are present 625, and a value of the current latency tolerance 515. In the illustrated embodiment, turn logic 610 is configured to generate a force early turn signal 615 when one or more conditions are met.

Write queue status 620, in some embodiments indicates a number of entries in write queue 202. Speaking generally, it may be undesirable to force a turn from write to read when write queue 202 is relatively full.

LLT read traffic present signal 625, in some embodiments, indicates whether there is a LLT read transaction that is ready to activate. If this is not the case, turn logic 610 may not force an early turn, e.g., because other types of traffic such as RT may be satisfied with the current turn configuration.

If the current latency tolerance 515 is low, turn logic 610 may avoid forced turns to ensure that RT traffic receives its requested bandwidth.

In some embodiments, turn logic 610 is configured to force an early write to read turn only if the write queue is below a threshold, LLT read traffic is present, and current latency tolerance 515 meets a threshold. In some embodiments, turn logic 610 may also monitor LLT bandwidth and may be configured to allow forced turns only if LLT bandwidth is below a threshold over a relevant time interval.

In some embodiments, turn logic is configured to force turn from writes to reads only after performing a minimum number of writes in the write turn. This minimum number may be fixed or dynamic. In dynamic embodiments, the minimum number of writes may be adjusted based on measured changes in write queue 202 after one or more prior forced read turns.

Although various parameters (such as parameters 620, 625, and 515 of FIG. 6) are discussed herein for determining when to force a turn, the exemplary parameters may be omitted, combined with other parameters, combined using various different logic or weights, used independently, etc. The disclosed combinations are included for purposes of illustration but are not intended to limit the scope of the present disclosure.

Exemplary Latency-Tolerance-Based Bandwidth Allocation

In some embodiments, memory controller circuit 101 is configured to allocate slots to one or more virtual channels based on current latency tolerance 515. This allocation may be in place of or in combination with other techniques for slot allocation.

Figure 7A:
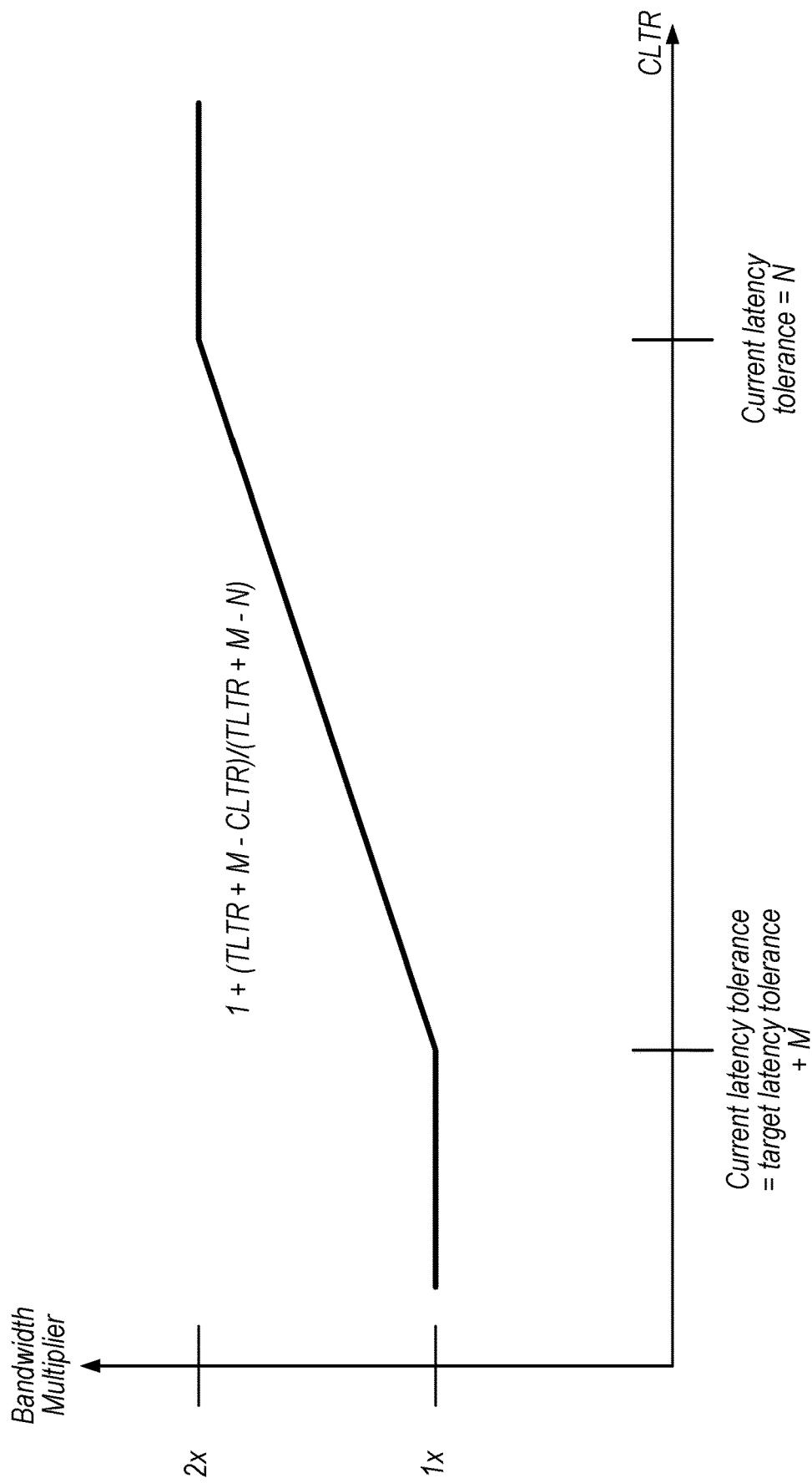
FIGS. 7A-7B are diagrams illustrating exemplary transfer functions for determining a bandwidth multiplier for a type of traffic based on latency tolerance, according to some embodiments.
Figure 7B:
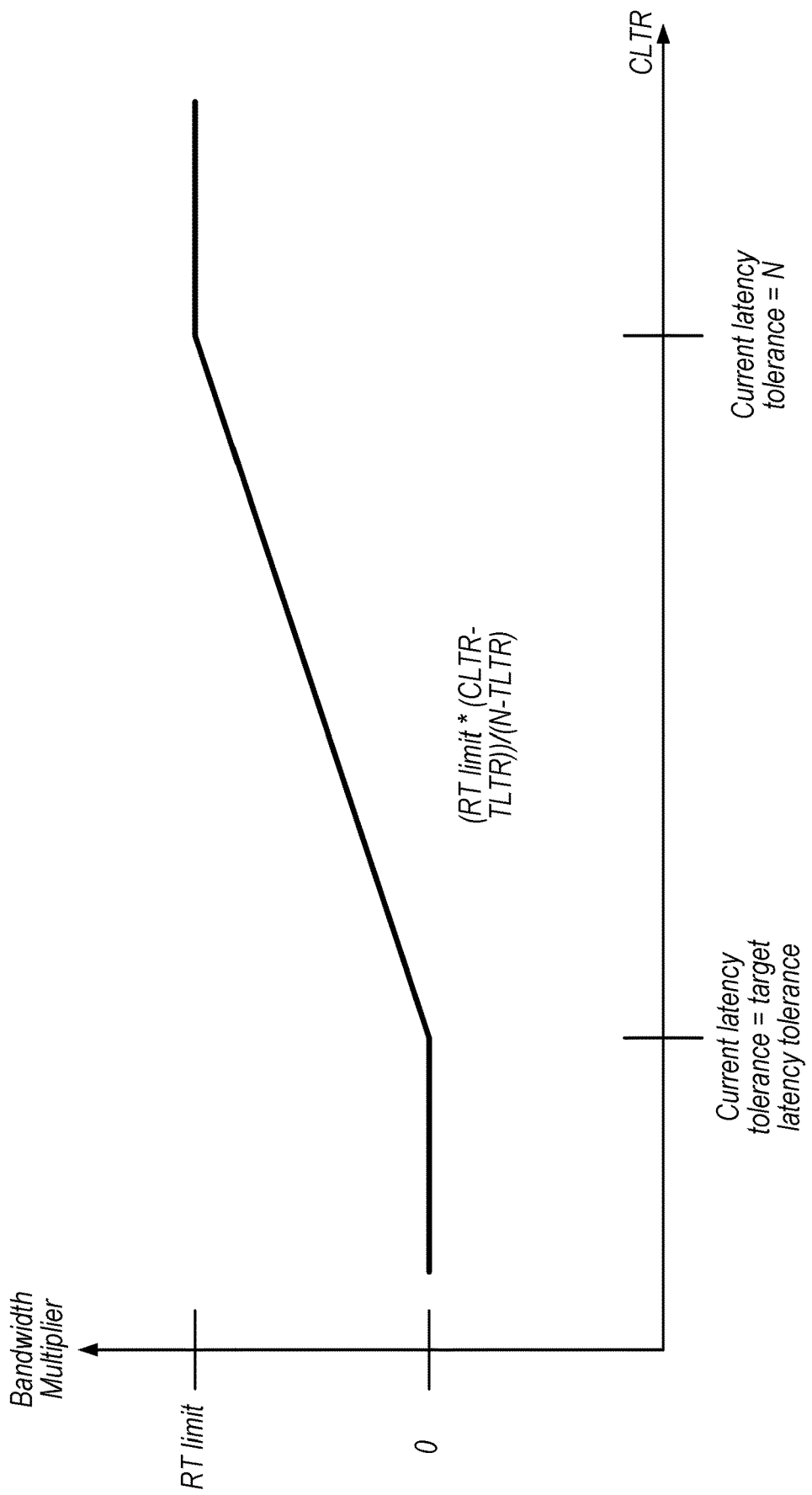

FIGS. 7A-7B are examples of transfer functions for assigning bandwidth to the RT virtual channel based on latency tolerance. Although the disclosed functions are discussed in the context of slot allocation, the disclosed techniques may be used to affect bandwidth using other functions, in other embodiments.

FIG. 7A shows a first transfer function in which RT receives a 1× bandwidth multiplier until the current latency tolerance equals the target plus a value M. The bandwidth multiplier may be used to adjust a default number of slots per turn for RT traffic, for example. The added value M may ensure that the current latency tolerance will pass the target during catch-up, and may be determined as a percentage of the target latency tolerance. In the illustrated embodiment, the bandwidth multiplier then ramps up to 2× until the current latency tolerance reaches a value N, which may be fixed or may be related to the target latency tolerance. (Note that the exemplary 1× and 2× multipliers are shown for purposes of illustration, but any of various multipliers may be used in other embodiments). In the illustrated embodiment, the equation of the ramp-up is: bandwidth multiplier=1+(TLTR+M−CLTR)/(TLTR+M−N).

FIG. 7B shows a second transfer function in which RT receives a zero bandwidth multiplier until the current latency tolerance meets the target, then ramps up until reaching an RT limit when the current latency tolerance reaches a value N. In the illustrated embodiment, the equation of the ramp-up is: bandwidth multiplier=(RT limit*(CLTR−TLTR))/(N−TLTR).

Memory controller circuit 101 may implement one or both of the example functions of FIGS. 7A and 7B, among others. In some embodiments, memory controller circuit 101 is configured to determine a slot allocation based on both functions and determine a number of slots assigned to RT based on the larger result. After RT slots are determined, memory controller circuit 101 may assign remaining slots to LLT. If slots remain after LLT allocations, the remaining slots may be assigned to bulk traffic. Note that, after the number of slots are allocated, the techniques discussed above relating to category arbitration and overrides may be applied to determine actual memory transactions performed during specific slots.

In some embodiments, memory controller 101 is configured to provide a guarantee of forward progress for one or more groups of traffic. For example, because RT traffic may crowd out other channels, memory controller 101 may allocate a threshold number of slots to LLT and/or to bulk traffic before determining allocations for RT. This may avoid situations where RT starves other traffic for extended periods.

In some embodiments, using both CLTR-based transfer functions to assign slots during a turn and the override techniques discussed above may the memory controller to rapidly address situations where CLTR is low.

Exemplary Opportunistic Refresh Techniques

Memory controlled by memory controller circuit 101 should be periodically refreshed, in some embodiments. The concept of refreshing memory is well-understood and typically involves reading information from the memory and immediately rewriting the information to the same location, without modification. Speaking generally, it is desirable to maintain a certain refresh rate while avoiding interference with other read and write transactions.

FIG. 8A is a block diagram illustrating exemplary refresh counters, according to some embodiments. In some embodiments, the values of these counters are used to determine when to operate in certain refresh modes.

Refresh window counter 810, in the illustrated embodiment, is configured to measure a refresh interval. In the illustrated embodiment, the length of this interval is specified by window size control signal 815. In some embodiments, the memory controller circuit 101 has a goal of refreshing all controlled memory banks once within each refresh window measured by counter 810.

Refresh status counter 820, in the illustrated embodiment, generally indicates whether refreshes are being performed at a desired rate. In the illustrated embodiment, counter 820 increments at the end of each refresh period counted by counter 810. In the illustrated embodiment, counter 820 decrements each time all tracked banks have been refreshed. In some embodiments, memory controller circuit 101 is configured to operate in different refresh modes based on the value of counter 820.

FIG. 8B is a diagram illustrating exemplary different refresh modes corresponding to different values of counter 820. Below the low threshold, in the illustrated embodiment, memory controller circuit 101 ignores refreshes if there are any other memory transactions during the same time interval.

Between the low threshold and the mid threshold, in the illustrated embodiment, memory controller circuit 101 opportunistically performs refreshes during write turns but does not perform refreshes during read turns. Between the mid threshold and the high threshold, in the illustrated embodiment, memory controller circuit 101 opportunistically performs refreshes during both read and write turns. A more detailed explanation of opportunistic techniques is included below, with reference to FIG. 9.

Above the high threshold, in the illustrated embodiment, memory controller circuit 101 operates similarly to between the mid and high thresholds, but reduces the window size in which refreshes should be performed (e.g., by reducing the value to which refresh window counter 810 counts). As discussed in further detail below, this may allow a rapid catch-up for refreshes.

Speaking generally, the opportunistic refresh techniques described in detail below attempt to perform refreshes without interfering with read and write transactions, but eventually will allow refreshes to delay other transactions. In a given refresh window, there may be one or more changes between read and write turns. In some embodiments, refreshes are opportunistically performed between these turns. Further, refreshes are opportunistically performed during turns when there is no read or write actually being performed in a particular slot.

Figure 9:
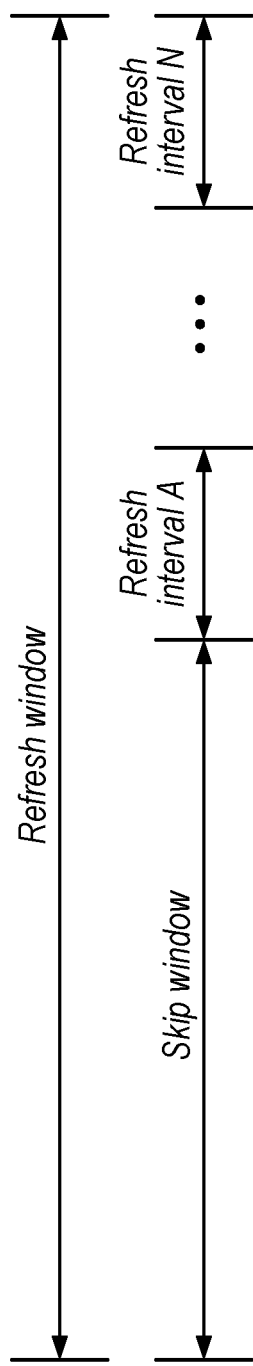
FIG. 9 is a diagram illustrating exemplary portions of a refresh window.

FIG. 9 shows an exemplary refresh window, according to some embodiments. In some embodiments, the length of the refresh window may vary based on current operating conditions (e.g., temperature). After a certain point in a refresh window refreshes must start or at least one bank will not be refreshed within the window. Said another way, after the illustrated "skip window," refreshes should start being performed if possible, or there is a chance that at least one bank will not be refreshed within the window. While the disclosed techniques contemplate such failure in certain situations, in some embodiments refreshes are scheduled with greater urgency after the end of the skip window, as discussed in detail below.

In some embodiments, the length of the skip window corresponds to an interval after which remaining refreshes can still be performed before the end of the refresh window. In some embodiments, the length of the skip window may be dynamically extended (e.g., if some refreshes occur during the skip window, the window may be extended because of a reduced number of refreshes remaining that need to be performed before the end of the refresh window).

Between the low and mid threshold of FIG. 8B, in some embodiments, the opportunistic technique skips any refreshes during the skip window that would interfere with another access. For the remaining portion of the refresh window, however, the opportunistic technique will perform refreshes even if they interfere with writes (although it will not perform refreshes that would interfere with reads, in this scenario).

Between the mid and high threshold of FIG. 8B, the opportunistic technique will perform refreshes after the skip window even if they interfere with reads or writes. In some embodiments, once a read or write transaction has been activated, it cannot be stopped, but proceeds until it is completed. Therefore, a worst-case timing interval for a transaction may exist, e.g., for a partial transaction of a particular size. This interval may correspond to an interval in which one or more refreshes could be performed.

Therefore, in some embodiments the system is configured to track multiple refreshes in the future to ensure that other transactions are not started when a refresh should occur. For example, the system may determine the last time at which the first remaining refresh can begin to avoid violating the refresh window. The arbitration circuit 302 that controls which bank to activate may take this into account and avoid scheduling transactions that would interfere with refreshes near the end of the refresh window. In some embodiments, if the worst-case transaction corresponds to an interval in which N refreshes could be performed, the system may begin reserving banks for the last N+1 refreshes to avoid conflicts toward the end of the refresh window.

In some embodiments, for an example in which the three last refreshes are selected, the following pseudo-code may be used to determine the cycle in which other transactions should be stopped (where tRFC corresponds to the refresh interval N of FIG. 9):

```
ready_for_3rd_last_refresh [bank] = activate_cycle <
    remaining_window - 3 * tRFC;
ready_for_2nd_last_refresh [bank] = activate_cycle <
    remaining_window - 2 * tRFC;
ready_for_last_refresh [bank] = activate_cycle < remaining_window -
    tRFC;
max_cycle [bank] =
```

```
(count(ready_for_3rd_last_refresh)  == 1     &&
ready_for_3rd_last_refresh[bank])  ?  remaining_window - 2 *
    tRFC :
(count(ready_for_2nd_last_refresh)  ==   2    &&
ready_for_2nd_last_refresh[bank]) ? remaining_window - tRFC :
(count(ready_for_last_refresh)   ==     3    &&
ready_for_last_refresh[bank]) ? remaining_window : 3* tRFC ;
```

Note that although the exemplary technique above has a three-transaction look-ahead, any of various numbers of look-ahead operations may be implemented in other embodiments. Even using the above-referenced techniques, the refresh counter status may occasionally meet the high threshold of FIG. 8B. In this situation, the system may reduce the size of the refresh window. This reduces the size of the skip window relative to the overall refresh window, which may allow the system to begin catching up on refreshes and reducing the refresh status counter value.

Exemplary Techniques for Allocating Reads and Writes based on Queue Thresholds

In some embodiments, the circuitry configured to determine allocations of bandwidth among reads and writes is configured to allocate this bandwidth based on one or more queue thresholds. For example, a low, medium, and high threshold may be maintained for each of the read queue 203 and the write queue 202.

In some embodiments, the circuit is configured not to schedule any writes until the number of eligible writes in the write queue 202 meets the low threshold. In some embodiments, there is also a minimum threshold for the write queue 202, below which the system is configured to switch back to reads if still performing writes.

In some embodiments, the low, medium, and high thresholds may be used to determine the portion of reads and writes to perform as a percentage of overall traffic. For example, if both queues are above the high threshold, balanced traffic between reads and writes may be selected. If the write queue 202 is at the low or medium threshold and the read queue 203 is at the high threshold, however, a greater portion of traffic may be allocated to reads. These thresholds may also be used to estimate traffic needed for types of traffic that do not explicitly request bandwidth (e.g., LLT and bulk).

In some embodiments, the depth of the write queue is designed based on the thresholds and may be larger than read queue 203. For example, the write queue may be sized to efficiently handle cases where a burst of writes are received and allow for buffering and performing writes out-of-order to improve overall performance.

In embodiments with posted writes, substantial time intervals may elapse without performing writes without causing latency issues, e.g., when the write queue 202 is below the low threshold. Traditionally, memory controllers have not entered self-refresh mode until all queues are empty. In some embodiments, however, memory controller circuit 101 is configured to cause the memory circuits to enter self-refresh mode when there are entries in write queue 202, if below the low threshold. The writes can then be performed after exiting self-refresh.

In some embodiments, if a power-down event occurs when in self-refresh mode when there are eligible write queue entries, the memory controller circuit 101 is configured to perform the remaining writes before the power-down event. This may slightly delay the power down event, but this latency may not be important given the likelihood of a much longer power down state and the ability to enter self-refresh with eligible write queue entries may substantially increase overall efficiency. In some embodiments, these techniques may advantageously improve performance by waiting to perform writes until more writes are available, rather than performing a less efficient write before entering self-refresh.

Exemplary Techniques for RAW Forwarding

In some embodiments, in which writes are posted, write data is posted to a write buffer until it is ready to actually be written to memory. In some embodiments, memory controller circuit 101 is configured to handle read-after-write (RAW) hazards by retrieving data from corresponding write buffer entries for at least a portion of the reads. In some implementations, this may avoid accessing memory for these reads at all. Such implementations may require somewhat complex dependency circuitry, however. For example, in some embodiments write commands are separate from write data. In these embodiments, the write command may indicate a size of the write, but the actual data may only be for a portion of that size. For example, the write data may have corresponding byte enables that indicate which bytes are actually modified. In these embodiments, the actual size of the write may not be known until the write data is received. Therefore, handling RAW hazards without accessing memory may involve waiting for the write data, determining whether the write data completely covers the read causing the hazard, and then either reading from memory if not or forwarding the write buffer data if so.

Waiting for the write data may also cause a write to block a read for a longer time interval, which may be undesirable (particularly if an RT write is blocking an LLT read, for example). Also, in some embodiments it is undesirable for a RAW hazard to affect the overall arbitration strategy for determining when to do writes (e.g., waiting until a sufficient number of write transactions are available for an efficient write turn).

Therefore, in some embodiments, memory controller circuit 101 is configured, upon detecting potentially conflicting read and write, to always perform the read and then to combine the read data with data from the write buffer (e.g., by replacing bytes of the read data with write buffer data for enabled bytes of the write buffer data). In some embodiments, this may improve performance by allowing read transactions to begin rather than waiting to determine whether write buffer data covers the reads and may reduce complexity of dependency circuitry.

In some embodiments, multiple writes to the same address are merged (as discussed in further detail below). Therefore, from the read transaction's point of view, it may need to worry about at most a single write transaction for RAW hazards.

Exemplary Write Merge Techniques

In some embodiments, writes to the same address may be combined (e.g., such that only a single write transaction for the most recent data is actually performed). In some embodiments write transactions are always received in order when there are write after write (WAW) situations to the same address. In some embodiments, memory controller circuit 101 is configured to reserve an entry in the write buffer for an incoming write and set an indication that the entry is occupied. When a younger incoming write hits the same entry, memory controller circuit 101 may use byte-enable data for the younger write to overwrite all or a portion of the write buffer data for the older write. The younger write may then be ignored, since its data has been combined with the data for the older write. In some embodiments, memory controller circuit 101 is configured to check for reads between writes that are being combined and refrain from combining writes with intervening reads to the same location.

In some embodiments, if a read is received while still waiting for data from a younger write that is being combined, the read may wait for the data from the younger write.

Exemplary Self-Refresh Techniques with Write Queue Thresholds

In some embodiments, memory controller 101 may place one or more memory circuits into a self-refresh mode in order to reduce power consumption in certain situations. Traditionally, self-refresh mode was used after both read and write queues were empty. In some embodiments, however, memory controller 101 is configured to enter self-refresh mode when there are outstanding write queue entries. For example, memory controller circuit 101 may maintain a write queue threshold and allow self-refresh if the number of requests in the write queue is below the threshold. This may not cause latency problems in embodiments with posted writes, for example.

In some embodiments, these techniques may advantageously improve performance by waiting to perform writes until more writes are available, rather than performing a less efficient write turn before entering self-refresh. In some embodiments, in response to a power-down event, memory controller 101 is configured to flush the write queue before powering down. This latency for flushing may not be problematic because power-down events are relatively rare and tend to have substantial duration.

Exemplary Methods

Figure 10:
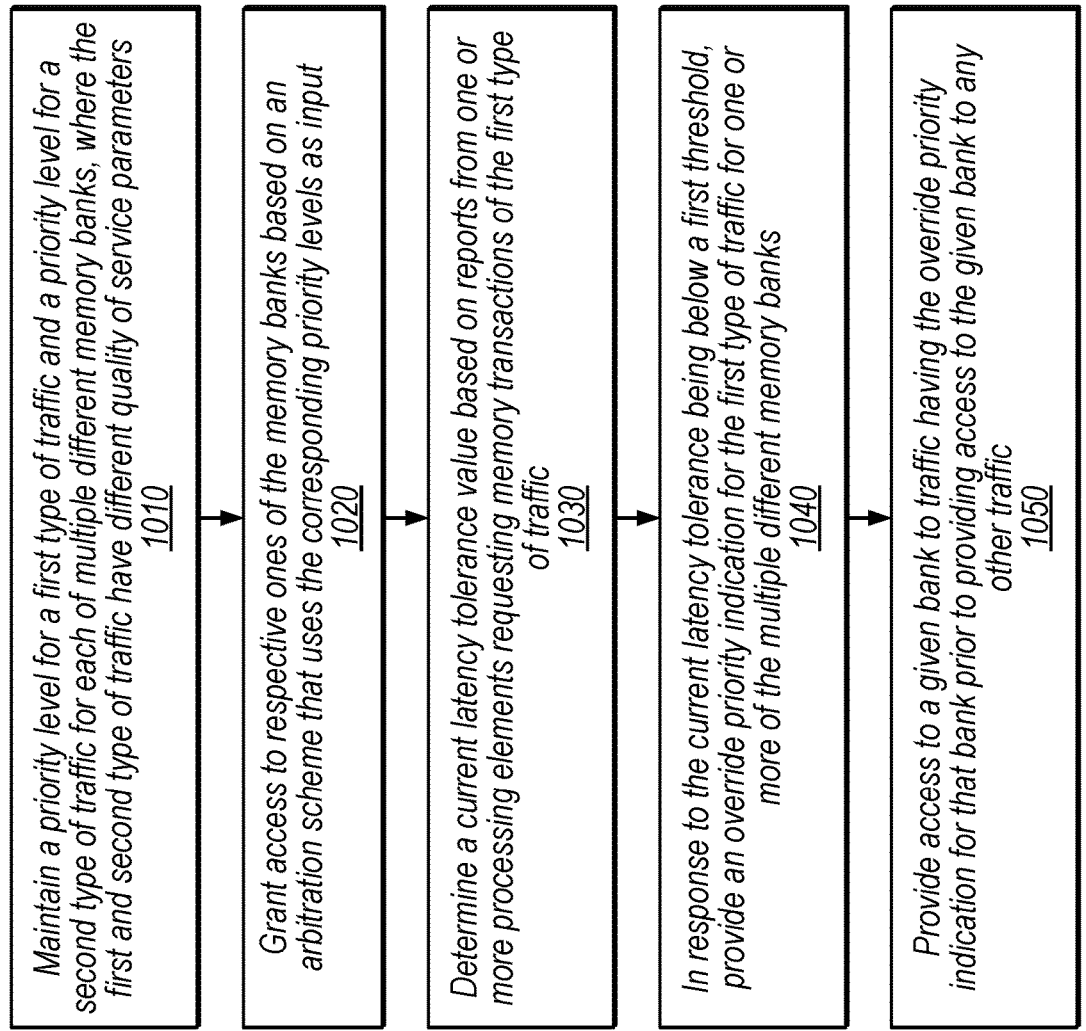
FIG. 10 is a flow diagram illustrating an exemplary method for granting overrides to a particular type of traffic, according to some embodiments.

FIG. 10 is a flow diagram illustrating a method 1000 for memory arbitration based on latency tolerance, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, a memory controller circuitry (e.g., arbitration circuit 103) maintains a priority level (e.g., a category value) for a first type of traffic (e.g., RT traffic) and a priority level for a second type of traffic (e.g., LLT traffic) for each of multiple different memory banks, where the first and second type of traffic have different quality of service parameters (e.g., RT traffic may have a bandwidth QoS parameter while LLT traffic may have a latency QoS parameter).

At 1020, in the illustrated embodiment, the memory controller circuitry grants access to respective ones of the memory banks based on an arbitration scheme that uses the corresponding priority levels as input. For example, for a given bank, the memory controller may select a virtual channel with the highest priority (and may use an LRU scheme in the case of ties). In some embodiments, the memory controller also separately arbitrates among banks, e.g., when there are requests to multiple available banks.

At 1030, in the illustrated embodiment, the memory controller circuitry determines a current latency tolerance value (e.g., CLTR) based on reports from one or more processing elements requesting memory transactions of the first type of traffic. For example, a graphics unit may report its current latency tolerance based on a buffer status.

At 1040, in the illustrated embodiment, the memory controller circuitry provides an override priority indication for the first type of traffic (e.g., an RT override) for one or more of the multiple different memory banks, in response to the current latency tolerance being below a first threshold. In some embodiments, the memory controller circuitry is further configured to provide an override priority indication for the second type of traffic (e.g., an LLT override) for one or more of the multiple different memory banks in response to the current latency tolerance meeting second, greater threshold.

At 1050, in the illustrated embodiment, the memory controller circuitry performs the arbitration scheme to provide access to a given bank to traffic having the override priority indication for that bank prior to providing access to the given bank to any other traffic.

In some embodiments, the memory controller circuitry is configured to determine whether to provide an override priority indication based on one or more of: whether the corresponding type of traffic has a threshold priority for the corresponding bank, whether there are a threshold number of slots remaining in a current read turn or write turn, whether the corresponding type of traffic has a threshold number of slots remaining, and/or whether overrides are currently enabled for the corresponding type of traffic. In some embodiments, the memory controller circuitry is configured to, in response to a grant to a particular bank, lower a priority level for the particular bank of the granted type of traffic. In some embodiments, the memory controller circuit is configured to, in response to determining that priority levels for all banks for a particular type of traffic are below a threshold priority level (e.g., category 2), increase priority levels for all banks for the particular type of traffic.

In some embodiments, the memory controller circuitry is configured to switch from a write turn to a read turn prior to a scheduled switch in response to: determining that the current latency tolerance is above a threshold, determining that a write queue has less than a threshold number of waiting entries, determining that a threshold number of writes in the write turn have been performed, and determining that one or more requests for the second type of traffic are present. In some embodiments, the memory controller is configured to adjust the threshold number of writes in the write turn based on one or more prior switches from a write turn to a read turn prior to a scheduled switch.

In some embodiments, the memory controller provides bandwidth to the first type of traffic based on a transfer function that uses the current latency tolerance as an input.

In some embodiments, the memory controller includes refresh circuitry configured to determine a refresh status based on a refresh window and tracking refreshes of a set of memory banks. In some embodiments, the memory controller is configured to skip one or more bank refreshes based on the refresh status. In some embodiments, wherein the apparatus is configured to determine whether to skip refreshes that interfere with read transactions based on whether the refresh status meets a first threshold. In some embodiments, the memory controller is configured to reduce a size of the refresh window in response to the refresh status meeting a second threshold. In some embodiments, the memory controller is configured to skip one or more refreshes in a skip portion of the refresh window but refrain from scheduling one or more read or write transactions that would interfere with one or more refreshes in a later portion of the refresh window.

In some embodiments, the memory circuit is configured to post write data to a write buffer and in response to detecting a potential read after write hazard, perform the read from memory without checking whether the read is covered by the write and combine the read data from memory with data from the write buffer for the write based on enable signals for the write.

In some embodiments, the memory controller circuitry is configured to maintain one or more write queue thresholds and one or more read queue thresholds and determine a number of reads for a read turn and a number of writes for a write term based on thresholds respectively reached by eligible entries in the read queue and write queue. In some embodiments, the memory controller circuitry is configured to refrain from scheduling write transactions until a threshold number of eligible write queue entries is reached.

SoC Overview

Figure 11:
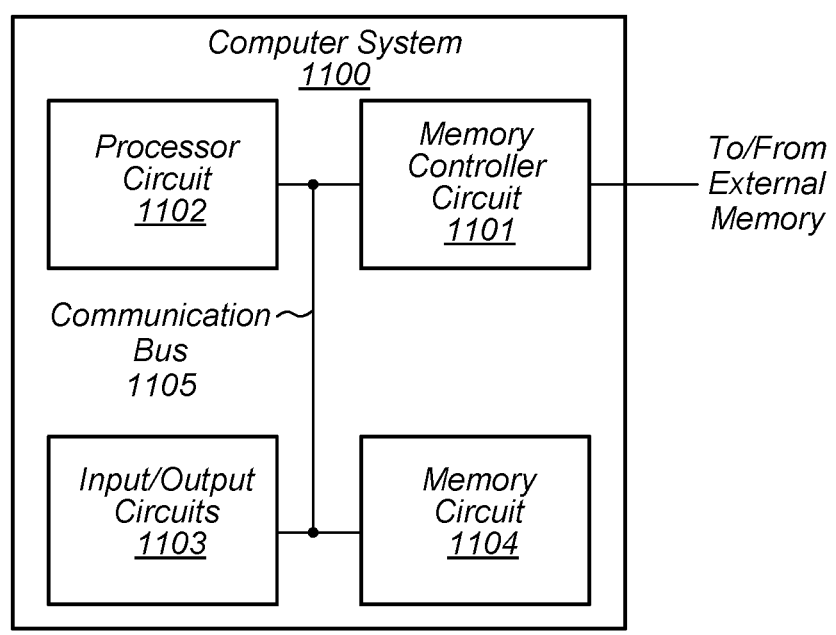
FIG. 11 is a block diagram illustrating an exemplary computer system that includes a memory controller circuit, according to some embodiments.

A block diagram of system-on-a-chip (SoC) is illustrated in FIG. 11. In the illustrated embodiment, the SoC 1100 includes memory controller circuit 1101, processor circuit 1102, input/output circuits 1103, and memory circuit 1104, each of which may be configured to send requests and data (collectively transactions) the other circuit blocks using communication bus 1105. In various embodiments, SoC 1100 may be configured for use in a desktop computer, server, or in a mobile computing application such as, e.g., a tablet, laptop computer, or wearable computing device. Although four circuit blocks are depicted in the embodiment of FIG. 11, in other embodiments, any suitable number of circuit blocks may be included in SoC 1100.

Memory controller circuit 1101 is configured to schedule access requests to external memory. In various embodiments, memory controller circuit 1101 may correspond to memory controller 101 as illustrated in FIG. 1, and the access requests may include both memory read access requests and memory write access requests. Such access requests may be received from processor circuit 1102, input/output circuits 1103, or any other suitable circuit block included in SoC 1100 (not shown).

Processor circuit 1102 may, in various embodiments, be representative of a general-purpose processor that performs computational operations. For example, processor circuit 1102 may be a central processing unit (CPU) such as a microprocessor, a microcontroller, an application-specific integrated circuit (ASIC), or a field-programmable gate array (FPGA).

Memory circuit 1104 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 11, a single memory circuit is depicted. In other embodiments, any suitable number of memory circuits may be employed.

Input/output circuits 1103 may be configured to coordinate data transfer between SoC 1100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1103 may be configured to implement a version of Universal Serial Bus (USB) protocol or IEEE 1394 (Firewire®) protocol.

Input/output circuits 1103 may also be configured to coordinate data transfer between SoC 1100 and one or more devices (e.g., other computing systems or integrated circuits) coupled to SoC 1100 via a network. In one embodiment, input/output circuits 1103 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1103 may be configured to implement multiple discrete network interface ports.

Figure 12:
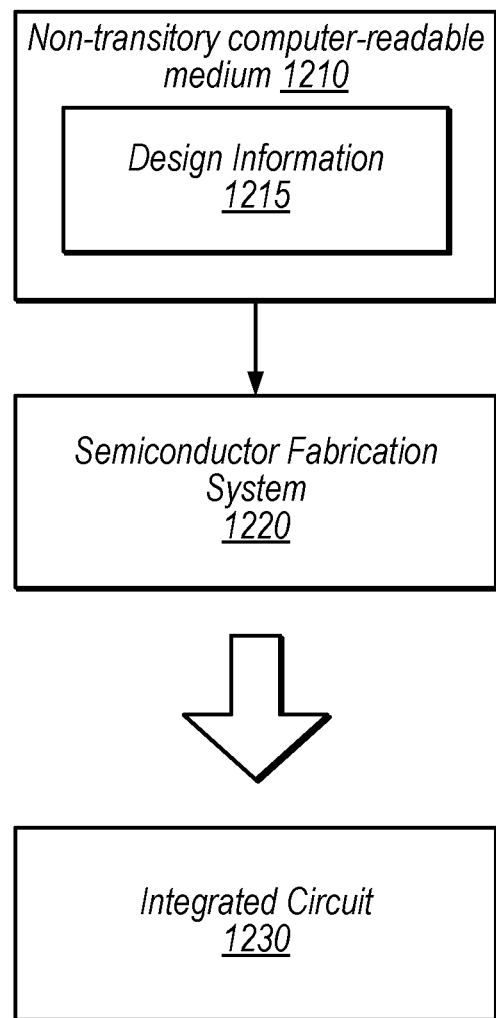
FIG. 12 is a diagram illustrating an exemplary circuit fabrication system, according to some embodiments.

FIG. 12 is a block diagram illustrating an example non-transitory computer-readable storage medium that stores circuit design information, according to some embodiments. In the illustrated embodiment, semiconductor fabrication system 1220 is configured to process the design information 1215 stored on non-transitory computer-readable storage medium 1210 and fabricate integrated circuit 1230 based on the design information 1215.

Non-transitory computer-readable storage medium 1210, may comprise any of various appropriate types of memory devices or storage devices. Non-transitory computer-readable storage medium 2310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system, such as semiconductor fabrication system 1220, for example. In some embodiments, design information 1215 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of cells included in the cell library.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown or described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    memory controller circuitry configured to:
        receive one or more reports from one or more processing elements that request memory transactions and determine a current latency tolerance value based on the reports, wherein the reports are based on status of one or more buffers in which the one or more processing elements are configured to store requests prior to submission to the memory controller circuitry;
        transition between read turns and write turns for accessing one or more storage elements according to a turn schedule; and
        switch from a write turn to a read turn prior to a scheduled switch based on the current latency tolerance meeting a threshold value.

2. The apparatus of claim 1, wherein the memory controller circuitry is configured to switch from the write turn to the read turn based on both:
    the current latency tolerance meeting the threshold value; and
    a write queue having less than a threshold number of waiting entries.

3. The apparatus of claim 1, wherein the memory controller circuitry is configured to switch from the write turn to the read turn based on both:

the current latency tolerance meeting the threshold value; and a threshold number of writes in the write turn having been performed.

4. The apparatus of claim 3, wherein the apparatus is configured to adjust the threshold number of writes in the write turn based on one or more write queue changes that occurred after one or more prior unscheduled switches from a write turn to a read turn.

5. The apparatus of claim 1, wherein the memory controller circuitry is configured to switch from the write turn to the read turn based on both:

the current latency tolerance meeting the threshold value; and one or more requests for a particular type of traffic being present.

6. The apparatus of claim 5, wherein the particular type of traffic is a low-latency tolerance type of traffic.

7. The apparatus of claim 1, wherein the apparatus is configured to switch from the write turn to the read turn in response to:

the current latency tolerance meeting the threshold value;

a write queue having less than a threshold number of waiting entries;

a threshold number of writes in the write turn having been performed during the write turn; and one or more requests for a particular type of traffic being present.

8. The apparatus of claim 1, further comprising:

refresh circuitry configured to determine a refresh status based on a refresh window and a track of refreshes of a set of memory banks;

wherein the apparatus is configured to skip one or more bank refreshes based on the refresh status.

9. A method, comprising:

receiving, by memory controller circuitry, one or more reports from one or more processing elements requesting memory transactions and determining a current latency tolerance value based on the reports, wherein the reports are based on status of one or more buffers in which the one or more processing elements are configured to store requests prior to submission to the memory controller circuitry;

transitioning between read turns and write turns for accessing one or more storage elements according to a turn schedule; and switching from a write turn to a read turn prior to a scheduled switch based on the current latency tolerance meeting a threshold value.

10. The method of claim 9, wherein the switching is further based on:

determining that a write queue has less than a threshold number of waiting entries;

determining that a threshold number of writes in the write turn have been performed; and determining that one or more requests for a particular type of traffic are present.

11. A non-transitory computer readable storage medium having stored thereon design information that specifies a design of at least a portion of a hardware integrated circuit in a format recognized by a semiconductor fabrication system that is configured to use the design information to produce the circuit according to the design, including:

memory controller circuitry configured to:

receive one or more reports from one or more processing elements requesting memory transactions and determine a current latency tolerance value based on the reports, wherein the reports are based on status of one or more buffers in which the one or more processing elements are configured to store requests prior to submission to the memory controller circuitry;

transition between read turns and write turns for accessing one or more storage elements according to a turn schedule; and switch from a write turn to a read turn prior to a scheduled switch based on the current latency tolerance meeting a threshold value.

12. The non-transitory computer readable storage medium of claim 11, wherein the memory controller circuitry is configured to switch from the write turn to the read turn based on both:

the current latency tolerance meeting the threshold value; and a write queue having less than a threshold number of waiting entries.

13. The non-transitory computer readable storage medium of claim 11, wherein the memory controller circuitry is configured to switch from the write turn to the read turn based on both:

the current latency tolerance meeting the threshold value; and a threshold number of writes in the write turn having been performed.

14. The non-transitory computer readable storage medium of claim 13, wherein the circuit is configured to adjust the threshold number of writes in the write turn based on one or more write queue changes that occurred after one or more prior unscheduled switches from a write turn to a read turn.

15. The non-transitory computer readable storage medium of claim 11, wherein the memory controller circuitry is configured to switch from the write turn to the read turn based on both:

the current latency tolerance meeting the threshold value; and one or more requests for a particular type of traffic being present.

16. The non-transitory computer readable storage medium of claim 15, wherein the particular type of traffic is a low-latency tolerance type of traffic.

17. The non-transitory computer readable storage medium of claim 11, wherein the circuit is configured to switch from the write turn to the read turn in response to:

the current latency tolerance meeting the threshold value;

a write queue having less than a threshold number of waiting entries;

a threshold number of writes in the write turn having been performed during the write turn; and one or more requests for a particular type of traffic being present.

* * * * *